INVENTOR.
HANS-JÜRGEN FRANZ

BY

McGlew & Toren
ATTORNEYS

INVENTOR.
HANS-JÜRGEN FRANZ
BY
McGlew & Toren
ATTORNEYS

United States Patent Office 3,494,193
Patented Feb. 10, 1970

3,494,193
APPARATUS FOR THE CAPACITATIVE MEASUREMENT OF THE LEVEL OF MATERIAL IN A CONTAINER
Hans-Jürgen Franz, Fahrnau, Baden, Germany, assignor to Endress & Hauser GmbH & Co., Baden, Germany
Filed Feb. 14, 1968, Ser. No. 705,342
Claims priority, application Germany, Feb. 15, 1967, E 33,396
Int. Cl. G01f 23/00
U.S. Cl. 73—304                                    7 Claims

ABSTRACT OF THE DISCLOSURE

An arrangement for the capacitative measurement of tne filling level of a container include a probe extending centrally and substantially vertically of the container, means for applying an A.C. voltage between the probe and the container, and an indicator connected in a circuit for measuring the capacity existing between the probe and the container with different levels of filling of the container. A no-load or "container empty" compensating circuit is provided which directs, through the indicator, a current in opposition to the current flowing in the indicator as a result of the capacity between the probe and the container. This reverse current is used to compensate the indicator, for the no-load, or "container empty," capacity value, at a certain deflection of the indicator. The arrangement is such that its sensitivity does not depend either on the adjustment of the no-load compensating circuit or on the magnitude of the no-load capacity.

BACKGROUND OF THE INVENTION

Capacitative measurement of filling levels is based on the principle that, when a container is filled with material, the dielectric constant varies up to the filling level, and thus the measurable probe capacity varies with respect to the capacity when the container is filled with air.

It is known to use bridge connections or circuits for the capacitative measurement of filling levels, these bridge circuits being supplied or fed by an A.C. generator. The probe capacity is arranged in one branch of the bridge circuit and a smoothing condenser is arranged in an adjacent branch of the bridge circuit. The output signal of the bridge is amplified and rectified in an amplifier and rectifier arrangement connected in series with the bridge, and the rectified and amplified signal is indicated on a suitable indicating instrument, such as a voltmeter or an ammeter. Since the empty container also has a certain no-load capacity, a certain deflection or reading of the indicator is obtained even when the container is empty. By adjusting the smoothing condenser, the circuit can be so balanced that the reading on the indicator is zero when the container is empty.

However, this arrangement has the disadvantage that the sensitivity, or the necessary capacity variation of the measuring probe for a certain deflection of the indicator, is a function of a no-load capacity of the probe. With increasing no-load capacity of the probe, the sensitivity decreases. The arrangement has the further disadvantage that the capacity of the cable extending between the transformer and the probe is added to the capacity of the probe, thus further reducing the sensitivity. Consequently, the connection between the measuring circuit and the probe cannot be extended or lengthened at random or at will.

In order to obviate this last-mentioned disadvantage, it is known to use capacitative measurement arrangements wherein variations of the probe capacity are transformed or converted linearly into direct current variations, by means of a special circuit. If the D.C. variations at the output of the circuit are sufficiently large, they are indicated directly on an indicator. However, if they cannot be indicated directly by the indicator or indicating instrument, the D.C. variations are so amplified in an indicator amplifier that they can be indicated on an indicating instrument such as, for example, a voltage indicator or volt meter.

In the known arrangement where the D.C. variations are indicated directly by an indicator, a long connection between the indicator and the probe can be used, but this arrangement does not provide a no-load compensating circuit. The known arrangement for an indicator-amplifier as used has a no-load compensating circuit consisting of a variable resistance. One end of the no load compensating circuit is connected with the output of the capacity measuring circuit, and the other end thereof is connected with one pole or terminal of a voltage source. The arrangement also has a full-load compensating circuit, which likewise consists of variable resistance, and one end of the full-load compensating circuit is connected with the output of the capacity measuring circuit while the other end of the full-load compensating circuit is grounded.

With this arrangement, when the container is empty, the no-load compensating circuit is so adjusted that the entire no-load current at the output of the capacity measuring circuit flows through a no-load compensating resistance. This produces, at the input of the indicator amplifier, a certain voltage corresponding to a certain reading on the indicator. When the container is filled, the capacity measuring circuit delivers a larger current which flows through the full-load compensating resistance, so that the voltage at the input of the indicator-amplifier, and thus the reading on the indicator, varies. To make certain that the reading is exactly 100 percent when the container is full, the resistance of the full-load regulator, and thus the voltage at the input of the indicator amplifier, are so adjusted that this value is obtained.

This measuring arrangement has the disadvantage, however, that its highest possible sensitivity is a function of the no-load probe capacity. With a certain no-load current, the no-load compensating resistance is at first so adjusted that the voltage at the input of the indicator amplifier assumes a certain value. If the no-load current is increased, due to a higher load capacity, the resistance on the no-load compensating circuit must be reduced so that the same voltage is obtained at the input of the indicator amplifier. Since the resistance of the no-load compensating circuit forms a part of the load of the capacity measuring circuit, the sensitivity of the arrangement decreases with increasing no-load current and also with decreasing resistance of the no-load compensating circuit. The sensitivity decreases approximately linearly with increasing no-load capacity. In other words, for a sufficient sensitivity, this measuring arrangement can be used only with measuring probes and containers having a small no-load capacity, that is, only for containers whose length and through capacity is limited.

SUMMARY OF THE INVENTION

This invention relates to the capacitative measurement of the filling level of a container and, more particularly, to an improved arrangement of this type whose sensitivity does not depend on the no-load capacity of a measuring probe positioned substantially vertically within the container.

In accordance with one embodiment of the invention, a capacity measuring circuit produces, in a known manner, a current which flows in the indicator and which is proportional to the probe capacity. The current indicator is compensated, to a certain value at a certain filling level of the container, by a reverse current from a no-load compensating circuit. Since, in this arrangement, a direct current output of the capacity indicating circuit is a measure of the magnitude of the probe capacity, and as the no-load current is compensated by a corresponding or equal reverse current, the sensitivity of the arrangement does not depend on the no-load capacity.

In a specific arrangement in accordance with this embodiment, the output of an A.C. generator is connected in the capacity measuring circuit with the probe capacity through a transformer and a diode. A D.C. voltage source is connected with the probe capacity through a switch which is conductive during that half wave of the generator voltage during which the diode is blocked, and the current indicator is arranged between the D.C. voltage source and the probe capacity. The no-load compensating circuit has the same structure or circuitry as the capacity measuring circuit except that an adjustable condenser is provided instead of the probe capacity. The current indicator is connected into the output circuits of both the capacity measuring circuit and the no-load compensating circuit, in such a manner that it is traversed, in opposite directions, by the direct current outputs of these two circuits. By varying the capacity of the adjustable smoothing condenser, the current of the no-load compensating circuit flowing through the current indicator can be so adjusted that the deflection of the current indicator corresponds to a certain filling level of the container. For example, when the container is empty, the effective current flow through the current indicator can be compensated to be zero.

In another circuit arrangement of this embodiment of the invention, the output of the A.C. voltage generator is connected in the capacity measuring circuit with the probe capacity through a transformer and a diode, and a D.C. voltage source is again connected with the probe capacity through a switch which is conductive during that half wave of the generator voltage during which the diode is blocked. A current indicator is arranged between the D.C. voltage source and the probe capacity, and the no-load compensating circuit includes a transistor whose collector is connected, through the current indicator, with one terminal of another D.C. voltage source. The emitter of the transistor is connected, through an emitter resistance, with the other terminal of this D.C. voltage source, and a potentiometer is connected across such other D.C. voltage source with its tap connected to the base of the transistor. The transistor acts as a constant current source and, by varying the bias voltage of the transistor base, the current in the current indicator can be compensated to zero or any other desired value.

In another embodiment of the invention, the output of the capacity measuring circuit is connected, in a known manner, with the input of an amplifier feeding the indicator, and with the no-load compensating circuit and with a full-load compensating circuit. The no-load compensating circuit is designed as a constant current source through which flows the entire no-load current of the capacity measuring circuit necessary for compensation to a certain deflection. Since, in this arrangement, the input resistance of the no-load compensating circuit, which is designed as a constant current source, is very high for D.C. variations with different no-load currents, as seen from the output of the capacity measuring circuit and as compared to the full-load compensating circuit acting as a load resistance, the sensitivity of the arrangement is independent of the no-load current.

An object of the invention is to provide an improved arrangement for the capacitative measurement of the filling level of a container.

Another object of the invention is to provide such an arrangement in which the sensitivity does not depend on the no-load capacity of the measuring probe.

A further object of the invention is to provide such an arrangement including a no-load compensating circuit effective to provide a current flow, through an indicator at a predetermined value, which is equal and opposite to the current flow corresponding to the probe capacity.

Still another object of the invention is to provide such an arrangement in which the current indicator is connected both in the output circuit of the capacity measurement circuit and the output circuit of the no-load compensating circuit.

A further object of the invention is to provide such an arrangement in which the no-load compensating circuit includes a transistor acting as a constant current source and means for adjusting the base bias of the transistor.

Yet, another object of the invention is to provide such an arrangement including a full-load compensating circuit in conjunction with a no-load compensating circuit designed as a constant current source.

A further object of the invention is to provide such an arrangement in which a relatively long connection can be used between the indicator and the probe.

BRIEF DESCRIPTION OF THE DRAWINGS

For an understanding of the principles of the invention, reference is made to the following description of typical embodiments thereof as illustrated in the accompanying drawings.

In the drawings.

DESCRIPTION OF THE PREFERRED EMBODIMENTS

Figure 1:
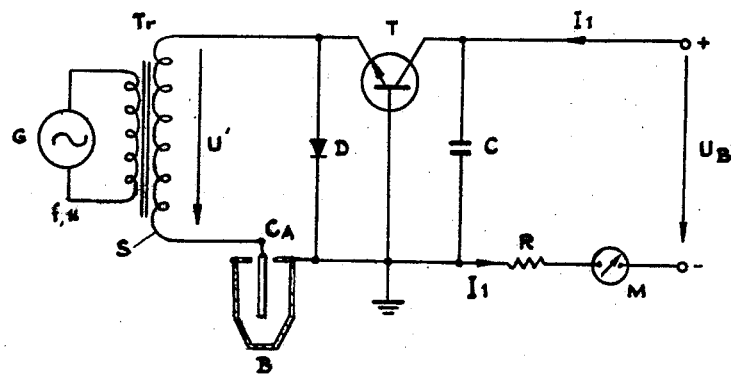
FIG. 1 is a schematic wiring diagram of a capacity measuring circuit used in one embodiment of the invention.

Referring first to FIG. 1, an A.C. voltage generator G is connected across the primary winding of a transformer $Tr$. Generator G may develop, for example an A.C. voltage of $10^6$ cps. One output terminal of secondary winding S of transformer $Tr$ is connected with the anode of a diode D, whose cathode is connected to a container B. The other output terminal of secondary winding S is connected directly with the measuring probe P which extends substantially vertically and substantially centrally into container B. The emitter-base circuit of an NPN transistor T is connected in parallel with diode D with the collector of transistor T being connected with the positive terminal of a source $U_B$ of D.C. voltage. The negative terminal of source $U_B$ is connected, through a series combination of a resistor R and an indicating meter M, with container B. A condenser C is connected in parallel with the collector-base circuit of transistor T. Container B is grounded in a known manner.

The capacity $C_A$ existing between container B and measuring probe P is charged by the positive half wave of the A.C. voltage $U'$ across secondary winding S of transformer $Tr$ through diode D. The resulting charge on the capacity $C_A$ thus corresponds to this capacity and to the peak voltage of the positive half wave of the secondary voltage $U'$ of transformer $Tr$. During charging of capacity $C_A$, transistor T is non-conductive. Condenser C is charged to full D.C. voltage $U_B$. During the negative half wave of the secondary voltage of transformer $Tr$, diode D is blocked, but transistor T is conductive since its emitter is now negative with respect to its base. Consequently, a current flows through the collector-emitter circuit of transistor T and through secondary winding S of transformer $Tr$, so that capacity $C_A$ is recharged. The charge required for recharging capacity $C_A$ is derived from condenser C. During the positive half wave, however, condenser C is again charged to the full D.C. voltage $U_B$. This cycle is repeated at the frequency of generator G, in the present case $10^6$ times per second.

The current which charges condenser C is integrated by the action of this condenser and of resistance R, and is indicated on indicator M which may be an ammeter or a volt meter. With a fixed generator voltage and a fixed generator frequency, this charging current is approximately proportional to the probe capacity. If the circuit of FIG. 1 is used by itself, a measuring value will also be indicated when the container is empty, because the no-load capacity of the probe is also recharged in the manner mentioned above.

Figure 2:
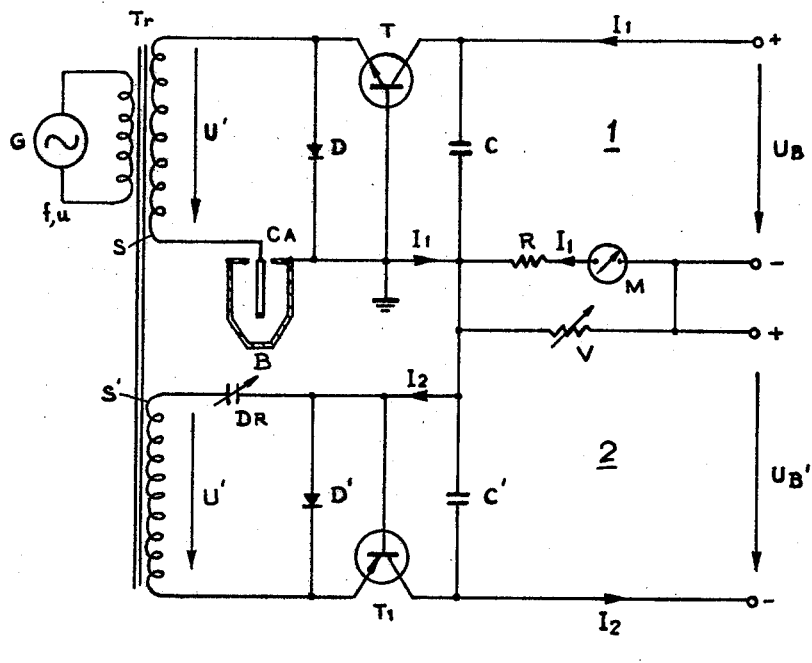
FIG. 2 is a schematic wiring diagram of a complete capacity measuring arrangement utilizing the circuit of FIG. 1 together with a no-load compensating circuit.

FIG. 2 illustrates an embodiment of the invention where no-load compensation is additionally possible. In the arrangement shown in FIG. 2, the capacity measuring circuit 1, which is the circuit of FIG. 1, is connected with a no-load compensating circuit 2 which corresponds substantially, in its structure and connections, to the capacity measuring circuit 1 and which is supplied by an additional secondary winding S' of transformer T$r$. Current indicator M and resistance R are so connected into the output circuits of both the capacity measuring circuit 1 and the no-load compensating circuit 2 that they are traversed by the direct current outputs of both these circuits.

Instead of the NPN transistor T, the no-load compensating circuit 2 contains a PNP transistor $T_1$. A diode D' is connected in parallel with the emitter-base circuit of transistor $T_1$, and the cathode of diode D' is connected with the emitter of transistor $T_1$. Accordingly, the D.C. voltage source $U_B'$ of no-load compensating or balancing circuit 2, is poled oppositely as compared to the D.C. voltage source of circuit 1. The result is that a compensating current $I_2$ flows in current indicator M in opposition to the direct current output $I_1$ of capacity measuring circuit 1. The probe capacity is replaced, in circuit 2, by an adjustable condenser DR. A variable resistance V, for full-load compensating control, is connected in parallel with the series combination of indicator M and resistance R.

When container B is empty, a no-load current $I_{10}$ flows in the current indicator M, this current corresponding to the no-load capacity of the probe. By means of the variable condenser, the compensating current $I_2$ can be so adjusted that the total current $I_{10}-I_2$ in current indicator M becomes zero. When the probe capacity varies during the filling of the container, the current difference $I_1-I_2$ flows through current indicator M and is a measure of the filling level of the container.

For compensating the deflection, for example, with the full container to 100 percent, resistance V is so adjusted that the desired current flow is attained. This circuit arrangement has the advantage that variations in the generator voltage and in the generator frequency are compensated to a great extent, since these variations act both on the capacity measuring circuit and on the no-load compensating circuit. However, in this arrangement it is not advisable to separate the probe and the indicator by long lines, since the zero setting of the indicator is effective through a variable condenser DR in the A.C. part of the no-load compensating circuit, and this condenser must be arranged adjacent the transformer.

Figure 3:
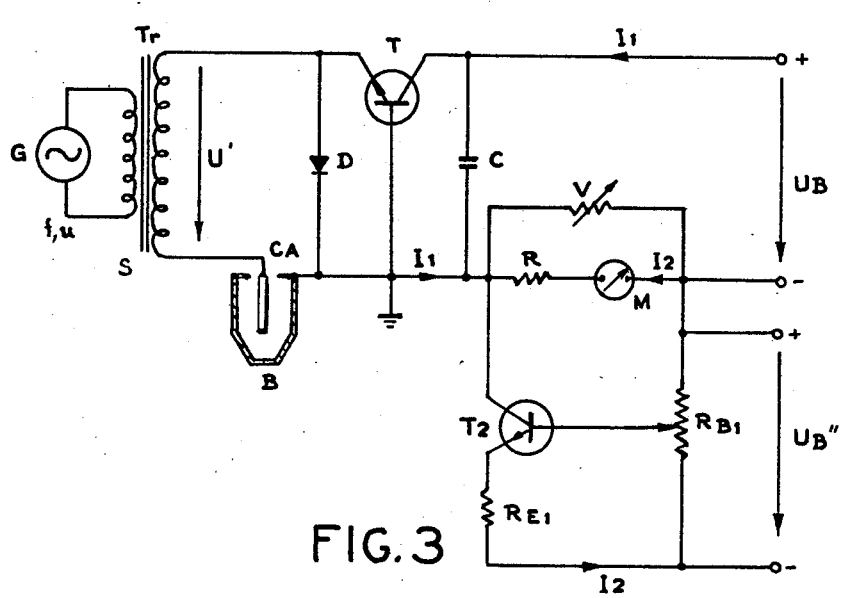
FIG. 3 is a schematic wiring diagram illustrating another embodiment of a complete arrangement for measuring the filling level of a container, utilizing the circuit of FIG. 1 with a different form of no-load compensating circuit.

An alternative embodiment of the no-load compensating circuit is illustrated in FIG. 3. Referring to FIG. 3, the capacity measuring circuit shown in FIG. 1 is connected with a no-load compensating circuit including an NPN transistor $T_2$ whose adjustable collector current serves to provide the compensating current $I_2$. To this end, current indicator M, resistance R connected in series therewith and variable resistance V, connected in parallel with the series combination of meter M and resistance R, are included in the collector circuit of NPN transistor $T_2$. The emitter of transistor $T_2$ is connected, through an emitter resistance $R_{E1}$, with one terminal of an additional D.C. voltage source providing a voltage $U''_B$. This D.C. voltage source, whose other terminal is connected with the indicator terminal of the D.C. voltage source providing the voltage $U_B$, is so poled that the collector current of transistor $T_2$, used as a compensating current, is directed in opposition to the capacity indicating current $I_1$. A potentiometer $R_{B1}$ is connected across the terminals of the D.C. voltage source $U''_B$, and the adjustable contact of this potentiometer is connected to the base of transistor $T_2$ and thus serves to adjust the base voltage or bias.

By adjusting the base bias or voltage of transistor $T_2$ by means of potentiometer $R_{B1}$, the collector current providing the compensating current $I_2$ can be so proportioned that the total current in the indicator can be compensated to zero. The arrangement shown in FIG. 3 has the advantage that the probe and the current indicator can be connected to each other by long lines.

Figure 4:
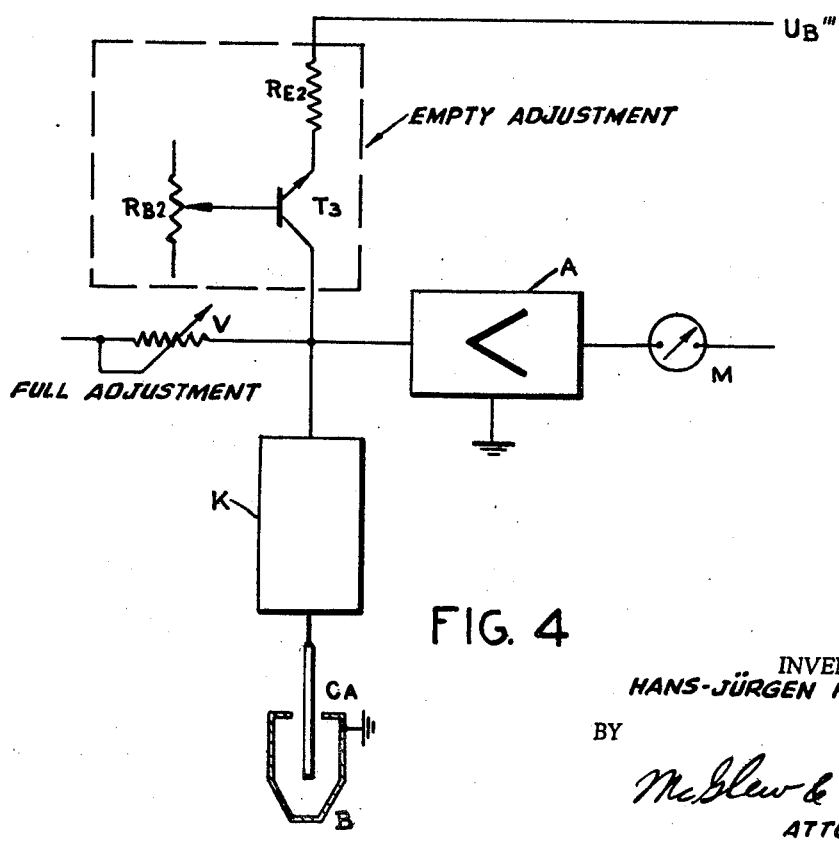
FIG. 4 is a schematic wiring diagram of a capacity measuring arrangement in accordance with a further embodiment of the invention.

FIG. 4 illustrates another arrangement, for measuring the filling level of the container B, in accordance with the invention and wherein the no-load compensation does not influence the sensitivity of the arrangement, even with different no-load currents. In the arrangement of FIG. 4, measuring probe B is connected with the input of a capacity measuring circuit K which can be designed, for example, in the same manner as the circuit shown in FIG. 1. However, the output of the capacity measuring circuit K is connected with the input of an indicator-amplifier A having its output connected to an indicator M. Capacity measuring circuit K is also connected with a no-load compensating circuit and, since the input of indicator M is high-ohmic, with a full-load compensating circuit V.

The no-load compensating circuit includes an NPN transistor $T_3$ whose collector is connected to the output of the capacity measuring circuit K and whose emitter is connected, through an emitter resistance $R_{E2}$, to one terminal of the voltage source $U'''_B$. The adjustable tap of a base biased potentiometer $R_{B2}$ is connected with the base of transistor $T_3$. The full-load compensating or adjusting circuit V consists of a variable ohmic resistance having one end connected to the output of capacity measuring circuit K.

The output of capacity measuring circuit K comprises a direct current which is proportional to the probe capacity. When container B is empty, this current is a so-called no-load current. The no-load compensating or adjusting circuit, including transistor $T_3$ acts as a current generator. The collector current of transistor $T_3$ can be adjusted by means of potentiometer $R_{B2}$. For no-load compensation, the collector current of transistor $T_3$ is so adjusted that it is equal to the no-load current of the capacity measuring circuit K. The voltage at the input of indicator-amplifier A can thus be set to a value $U_{no-load}$, by means of which a certain deflection, for example, the deflection zero, is effected on indicator M.

If the probe capacity $C_A$ varies, the current delivered by capacity measuring circuit K also varies. However, since the no-load compensating circuit acts as a current generator circuit, in that its current is constant at a certain setting of potentiometer $R_{B2}$ and as the input resistance of indicator-amplifier A is also very high, any current in addition to the no-load current flows through the full-load compensating circuit V. Consequently, only the voltage at the input of the indicator-amplifier varies, and this leads to a variation of the reading in the indicator. By varying the magnitude of the full-load balancing resistance V, it is possible to adjust the sensitivity of the arrangement.

Since the full-load balancing resistance V is practically the only load resistance following the no-load compensation, and the load resistance is thus independent of the no-load compensation, the sensitivity of the arrangement does not depend on the adjustment of the no-load compensating circuit or on the magnitude of the no-load capacity.

While specific embodiments of the invention have been shown and described in detail to illustrate the application of the principles of the invention, it will be understood that the invention may be embodied otherwise without departing from such principles.

What is claimed is:

1. In an arrangement for the capacitative measurement of the filling level of a container, of the type in which a measuring probe is positioned substantially vertically and centrally of the container, and including measuring indicator means in a capacity measuring circuit connected to the container and the probe and supplied by a source of A.C. potential to provide a forwardly directed current flow through the indicator means proportional to the magnitude of the probe capacity between the container and the probe corresponding to the filling level of the container: the improvement comprising a no-load compensating circuit connected to said indicator means and to a source of potential, and providing, at a selected filling level of said container and at a selected indication of said indicator means, a reversely directed current flow through said indicator means substantially equal in magnitude to said forwardly directed current flow; said source of A.C. potential comprising an A.C. voltage generator, and a transformer having a primary winding connected across said generator and a secondary winding; a diode connected between the probe capacity and said secondary winding; a first source of D.C. potential; and a switch connecting said first source of D.C. potential to the probe capacity, said switch being conductive during that half wave of the generator voltage during which said diode blocks flow of current; said indicator means comprising a current indicator connected between said first source of D.C. potential and the probe capacity.

2. In an arrangement for the capacitative measurement of the filling level of a container, the improvement claimed in claim 1, in which said no-load compensating circuit has the same circuit configuration as said capacity measuring circuit except for comprising an adjustable smoothing condenser at the same location therein as the location of the probe capacity in said capacity measuring circuit; a second source of D.C. potential connected to said no-load compensating circuit; said current indicator being connected in the outputs of both said capacity measuring circuits and said no-load compensating circuit in a manner such that it is traversed, in opposite direction, by the D.C. output currents of both circuits.

3. In an arrangement for the capacitative measurement of the filling level of a container, the improvement claimed in claim 2, in which said transformer includes a second secondary winding connected to said no-load compensating circuit.

4. In an arrangement for the capacitative measurement of the filling level of a container, the improvement claimed in claim 2, in which said switch in said capacity measuring circuit and the corresponding switch in said no-load compensating circuit comprise transistors, one transistor comprising a NPN transistor and the other transistor comprising a PNP transistor; said diode in said capacity measuring circuit having a direction of conduction opposite to that of the associated transistor and being connected in parallel with the emitter-base circuit of the associated transistor; the corresponding diode in said no-load compensating circuit having a direction of conduction opposite to that of the associated transistor in said no-load compensating circuit and connected in parallel with the emitter-base circuit thereof.

5. In an arrangement for the capacitative measurement of the filling level of a container, the improvement claimed in claim 1, in which said no-load compensating circuit includes a transistor and a second source of D.C. potential; said current indicator connecting the collector of said transistor to one terminal of said second source of D.C. potential; an emitter resistance connecting the other terminal of said second source of D.C. potential to the emitter of said transistor; a potentiometer, having an adjustable tap, connected across said second source of D.C. potential; and means connecting the adjustable tap of said potentiometer to the base of said transistor.

6. In an arrangement for the capacitative measurement of the filling level of a container, of the type in which a measuring probe is positioned substantially vertically and centrally of the container, and including measuring indicator means in a capacity measuring circuit connected to the container and the probe and supplied by a source of A.C. potential to provide a forwardly directed current flow through the indicator means proportional to the magnitude of the probe capacity between the container and the probe corresponding to the filling level of the container: the improvement comprising a no-load compensating circuit connected to said indicator means and to a source of potential, and providing, at a selected filling level of said container and at a selected indication of said indicator means, a reversely directed current flow through said indicator means substantially equal in magnitude to said forwardly directed current flow; an indicator-amplifier connected to the output of said capacity measuring circuit and having its output connected to said indicator; the output of said capacity measuring circuit being connected with the input of said no-load compensating circuit; said no-load compensating circuit developing a preselected bias voltage at the input of said indicator-amplifier, and being designed as a constant current source; a source of D.C. potential connected to said no-load compensating circuit; said no-load compensating circuit comprising a transistor having its collector connected with the output of said capacity measuring circuit; an emitter resistance connecting the emitter of said transistor with one terminal of said source of D.C. potential; and a potentiometer, having an adjustable tap, connected across said source of D.C. potential, the adjustable tap of said potentiometer being connected to the base of said transistor.

7. In an arrangement for the capacitative measurement of the filling level of a container, of the type in which a measuring probe is positioned substantially vertically and centrally of the container, and including measuring indicator means in a capacity measuring circuit connected to the container and the probe and supplied by a source of A.C. potential to provide a forwardly directed current flow through the indicator means proportional to the magnitude of the probe capacity between the container and the probe corresponding to the filling level of the container; the improvement comprising a no-load compensating circuit connected to said indicator means and to a source of potential, and providing, at a selected filling level of said container and at a selected indication of said indicator means, a reversely directed curent flow through said indicator means substantially equal in magnitude to said forwardly directed current flow; an indicator-amplifier connected to the output of said capacity measuring circuit and having its output connected to said indicator; the output of said capacity measuring circuit being connected with the input of said no-load compensating circuit; said no-load compensating circuit developing a preselected bias voltage at the input of said indicator-amplifier, and being designed as a constant current source; and a resistance forming a full-load compensating circuit, one terminal of said resistance being connected with the output of said capacity measuring circuit and the other terminal of said resistance being grounded.

References Cited

UNITED STATES PATENTS 3,161,054  12/1964  Cohn.

FOREIGN PATENTS 515,067  11/1952  Belgium.

S. CLEMENT SWISHER, Primary Examiner